US009508209B2

(12) United States Patent
Bu et al.

(10) Patent No.: US 9,508,209 B2
(45) Date of Patent: Nov. 29, 2016

(54) ULTRAVIOLET ANTI-COUNTERFEITING CHECK VERIFICATION METHOD

(75) Inventors: Jian Bu, Sichuan (CN); An Luo, Sichuan (CN); Shaochuan Feng, Sichuan (CN); Gaimei Shi, Sichuan (CN); Ruhuan Hu, Sichuan (CN); Ze Miu, Sichuan (CN); Yun Bai, Sichuan (CN); Yun Yang, Sichuan (CN)

(73) Assignee: CHENGDU SANTAI HOLDING GROUP CO., LTD., Chengdu, Sichuan (CN)

( * ) Notice: Subject to any disclaimer, the term of this patent is extended or adjusted under 35 U.S.C. 154(b) by 132 days.

(21) Appl. No.: 14/382,223

(22) PCT Filed: Aug. 22, 2012

(86) PCT No.: PCT/CN2012/080451
§ 371 (c)(1),
(2), (4) Date: Aug. 29, 2014

(87) PCT Pub. No.: WO2013/127162
PCT Pub. Date: Sep. 6, 2013

(65) Prior Publication Data
US 2015/0063673 A1 Mar. 5, 2015

(30) Foreign Application Priority Data

Mar. 2, 2012 (CN) .......................... 2012 1 0052697

(51) Int. Cl.
*G06K 9/00* (2006.01)
*G07D 7/12* (2016.01)
(Continued)

(52) U.S. Cl.
CPC ............. *G07D 7/12* (2013.01); *G06K 9/00463* (2013.01); *G06K 9/00483* (2013.01);
(Continued)

(58) Field of Classification Search
CPC .................................................. G06K 9/00493
USPC ........................................................ 382/137
See application file for complete search history.

(56) References Cited

U.S. PATENT DOCUMENTS 5,856,877 A * 1/1999 Burger ............... G06K 9/00463
358/448
7,110,573 B2 * 9/2006 Monk ...................... G07D 7/20
382/112

(Continued)

FOREIGN PATENT DOCUMENTS

CN 1313004 A 9/2001
CN 1623164 A 6/2005
(Continued)

*Primary Examiner* — Kim Vu
*Assistant Examiner* — Molly Delaney
(74) *Attorney, Agent, or Firm* — Novick, Kim & Lee, PLLC; Allen Xue

(57) ABSTRACT

The invention relates to a ultraviolet anti-counterfeiting check verification method which solves subjective defect and time consuming problems of the traditional verification methods, and comprises the following steps: a. collecting ultraviolet gray level image by a ultraviolet scanner; b. extracting a first binary image from the ultraviolet gray level image; c. calculating a tilt angle of the first binary image; d. calculating tilt correction positions of pixels of the ultraviolet gray level image and the first binary image; e. determining a top left corner locating position of a first binary image rectangle; f. extracting a second binary image from the tilt corrected ultraviolet gray level image; g. performing position correction on the second binary image of a check to be verified; and h. calculating the matching degree between the second binary image of the check to be verified and a second binary image of a real check to verify authenticity.

9 Claims, 2 Drawing Sheets

(51) Int. Cl.
  *G06Q 20/04* (2012.01)
  *G07D 7/20* (2016.01)
  *H04L 9/32* (2006.01)
  *G06K 9/32* (2006.01)
  *G09C 5/00* (2006.01)

(52) U.S. Cl.
  CPC ......... *G06K 9/3208* (2013.01); *G06Q 20/042* (2013.01); *G07D 7/2008* (2013.01); *G07D 7/2058* (2013.01); *H04L 9/3226* (2013.01); *G09C 5/00* (2013.01)

(56) References Cited

U.S. PATENT DOCUMENTS

| | | | | |
|---|---|---|---|---|
| 7,909,244 B2* | 3/2011 | Norris | ................ | G06Q 20/042 235/379 |
| 8,433,126 B2* | 4/2013 | Jones | ..................... | G06Q 20/18 382/135 |
| 8,497,983 B2* | 7/2013 | Cowburn | ............. | G03G 21/046 356/341 |
| 2003/0023557 A1* | 1/2003 | Moore | ..................... | G09F 3/00 705/50 |
| 2010/0040282 A1* | 2/2010 | Bala | ........................ | G06K 9/38 382/165 |
| 2012/0226600 A1* | 9/2012 | Dolev | .................... | G06Q 10/10 705/38 |

FOREIGN PATENT DOCUMENTS

| | | | | |
|---|---|---|---|---|
| CN | 101751713 A | 6/2010 | | |
| CN | 102136166 A | 7/2011 | | |
| CN | 102254367 A | 11/2011 | | |
| IL | WO 2011058554 A1 * | 5/2011 | ........... | G06K 9/6203 |

* cited by examiner

ULTRAVIOLET ANTI-COUNTERFEITING CHECK VERIFICATION METHOD

FIELD OF THE INVENTION

The invention relates to the field of anti-counterfeiting check verification, in particular to an image processing technology.

DESCRIPTION OF THE RELATED ART

The traditional check identification process comprises the following steps: a check accepting bank sends a check to the clearing center of Bank of China; the clearing center returns the check to the bank of deposit, and the bank of deposit verifies the check for authenticity by manual verification of seal or signature on the check; if the check passes verification, the check is valid, and the clearing center transfers the amount from the bank of deposit to the accepting bank. Such method is time-consuming and labor-consuming and poor in reliability. Since then, a fault-tolerant check recognition system based on variable code seal occurs, and is used for verifying check for authenticity through network on condition that the same bank or different banks access to the network, but such method requires different branches of the same bank or different banks to access to the network.

The previous methods are for verifying old checks for authenticity, but new checks have an ultraviolet anti-counterfeiting function compared with the old checks. Checks can be verified for authenticity on ultraviolet check images obtained by scanning. However, the ultraviolet images of different checks have certain tilt angles due to placement angle and light, and different check images have different sizes. Even two images of the same check obtained by twice scanning will be different in tilt angle and image size. The traditional verification methods are strong in manual detection subjectivity, and time-consuming and labor-consuming.

SUMMARY OF THE INVENTION

The purpose of the invention is to provide a ultraviolet anti-counterfeiting check verification method with high authenticity verification accuracy that can not be timely and quickly realized via the Internet.

The invention is realized as follows:

A real check entry unit (11) stores a ultraviolet gray level image obtained by scanning a real check of a bank in advance, a to-be-verified unit (12) scans a check to be verified to obtain a ultraviolet gray level image, a authenticity verification unit (13) completes authenticity verification by tilting the ultraviolet gray level image of the real check and the check to be verified and performing position correction, and feeds the verification result back to a verifier, and steps of extracting information from the ultraviolet gray level image of the real check and the check to be verified in the authenticity verification unit (13) comprise:
1 collecting a ultraviolet gray level image by a ultraviolet scanner;
2 extracting a first binary image from the ultraviolet gray level image;
3 calculating a tilt angle of the first binary image;
4 calculating a tilt correction position of each pixel of the ultraviolet gray level image and the first binary image;
5 determining a top left corner locating position of a first binary image rectangle; and
6 extracting a second binary image from the tilt corrected ultraviolet gray level image.

after completing information extraction of the ultraviolet gray level images of the check and the check to be verified, perform position correction on the second binary image of the ultraviolet gray level image of the check to be verified according to a locating position at the top left corner of the first binary image rectangle, calculate the matching degree with the second binary image of the ultraviolet gray level image of the real check, and perform authenticity verification.

In step 2, the extraction processes of the first binary image of the ultraviolet check gray level image are as follows:
The calculation formula of the value of each pixel of the first binary image is as follows:

$$D_1[i, j] = \begin{cases} 255, & I[i, j] < th_1 \\ 0, & I[i, j] \geq th_2 \end{cases}$$

$D_1[i, j]$ represents a value of a horizontal $i^{th}$ pixel perpendicular to a $j^{th}$ pixel in the first binary image, i is a variable standing for a horizontal position of the pixel in a window image and taken as i=1, 2, ..., $W_0$, j is a variable standing for a vertical position of the pixel in a window image and taken as j=1, 2, ..., $H_0$, $W_0$ is width of the ultraviolet gray level image, $H_0$ is height of the ultraviolet gray level image, I[i, j] represents a gray value of the horizontal $i^{th}$ pixel perpendicular to the $j^{th}$ pixel in the ultraviolet gray level image, $th_1$ is a segmentation threshold, and $th_1$ is selected such that black letters and form information in the check are highlighted and interference from ultraviolet information in the ultraviolet gray level image is removed.

In step 3, the calculation processes of a tilt angle of the first binary image are as follows:
(1) calculating a width-to-height ratio L of the first binary image:

$$L = \frac{W_0}{H_0}$$

wherein when L>2.5, $[x_0-a, y_0-b]$, $[x_1+a, y_0-b]$, $[x_0-a, y_1+b]$ and $[x_1+a, y_1+b]$ are positions of a top left corner, a top right corner, a bottom left corner and a bottom right corner of a first binary image rectangle respectively; when L≤2.5, a stub with a width of c is torn up, and $[x_0-a-c, y_0-b]$, $[x_1+a-c, y_0-b]$, $[x_0-a-c, y_1+b]$ and $[x_1+a-c, y_1+b]$ are positions of the top left corner, the top right corner, the bottom left corner and the bottom right corner of the first binary image rectangle respectively, a is a horizontal error value, b is a vertical error value, $x_0$, $x_1$ represents a horizontal coordinate of the pixel, and $y_0$, $y_1$ represents a vertical coordinate of the pixel;
(2) extracting a rectangular binary image R[i, j]:

$$R[i, j] = \begin{cases} D_1[x_0-a+i, y_0-b+j], & L > 2.5 \\ D_1[x_0-a-c+i, y_0-b+j], & L \leq 2.5 \end{cases}$$

wherein, i=1, 2, ..., $W_1$, j=1, 2, ..., $H_1$, $W_1=x_1-x_0+2\times a+1$, $H_1=y_1-y_0+2\times b+1$, $W_1$ is width of the rectangular binary image, $H_1$ is height of the rectangular binary image, and R[i, j] represents the value of the horizontal $i^{th}$ pixel perpendicular to the $j^{th}$ pixel in the rectangular binary image;
the rectangular binary image R[i, j] is rotated clockwise for −8° to 8° at an interval of 1°, $W_{2k}$ represents the width of the rectangular binary image area after the $k^{th}$ rotation, and $H_{2k}$ represents the height of the rectangular binary image area after the $k^{th}$ rotation, and the calculation methods thereof are as follows:

$$W_{2k}=\lfloor W_1 \times \cos\alpha + H_1 \times \sin\alpha \rfloor$$

$$H_{2k}=\lfloor W_1 \times \sin\alpha + H_1 \times \cos\alpha \rfloor$$

wherein, $\alpha=|k-9|°$ represents a rotation angle, $\lfloor \bullet \rfloor$ means an operational symbol rounded down, $\lfloor W_1 \times \cos\alpha + H_1 \times \sin\alpha \rfloor$ represents a greatest integer not more than $W_1 \times \cos\alpha + H_1 \times \sin\alpha$;

$R_k[i, j]$ represents a value of the horizontal $i^{th}$ pixel perpendicular to the $j^{th}$ pixel in the rectangular binary image after the $k^{th}$ rotation, the value is initialized, and the rectangular binary image $R[i, j]$ is rotated clockwise for $-8°$ and anticlockwise for $8°$ when $R_k[i, j]=0$, $i=1, 2, \ldots, W_{2k}$, $j=1, 2, \ldots, H_{2k}$ and $k=1$, then the rotated rectangular binary image at $\alpha=8°$ is obtained, and the calculation formula of the position $[i_1, j_1]$ of the pixel value, corresponding to the position $[i, j]$ of each pixel in the original rectangular binary image $R[i, j]$, in the rectangular binary image $R_1[i, j]$ after anticlockwise rotation for $\alpha$ is as follows:

$$\begin{bmatrix} i_1 \\ j_1 \\ 1 \end{bmatrix} = \begin{bmatrix} \cos\alpha & \sin\alpha & 0 \\ -\sin\alpha & \cos\alpha & W_1 \times \sin\alpha \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein, $[i_1, j_1]$ is obtained by operating and rounding down to an integer.

k is added by 1 in turn; when $k=2, 3, \ldots, 8$, the rectangular binary image $R[i, j]$ is rotated anticlockwise for $-7°$ to $-1°$, then obtain $R_2[i, j]$, $R_3[i, j]$, $\ldots$, $R_8[i, j]$ at $\alpha=|k-9|°$; when $k=9$ and the rotation angle is zero, $R_9[i, j]=R[i, j]$; when $k=10, 11, \ldots, 17$, the rectangular binary image $R[i, j]$ is rotated clockwise for $1°$ to $7°$, then $\alpha=|k-9|°$; and calculation formula of the position $[i_1, j_1]$ of the pixel value, corresponding to the position $[i, j]$ of each pixel in the original rectangular binary image $R[i, j]$, in the rectangular binary image $R_1[i, j]$ after anticlockwise rotation for $\alpha$ is as follows:

$$\begin{bmatrix} i_1 \\ j_1 \\ 1 \end{bmatrix} = \begin{bmatrix} \cos\alpha & -\sin\alpha & H_1 \times \cos\alpha \\ \sin\alpha & \cos\alpha & 0 \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein, $[i_1, j_1]$ is obtained by operating and rounding down to an integer.

obtaining $R_{10}[i, j]$, $R_{11}[i, j]$, $\ldots$, $R_{17}[i, j]$ respectively, 17 rectangular binary images $R_k[i, j]$ in total;

(3) performing vertical projection on each rotated rectangular binary image $R_k[i, j]$, and calculating a maximal projection value $m[k]$ thereof:

$$m[k] = \max_{j=1,2,\ldots,H_{2k}}(h_k[j]),$$
$$k = 1, \ldots, 17$$

wherein, $h_k[j]$ represents a vertical projection value of the rotated rectangular binary image, $$h_k[j] = \sum_{i=1}^{W_{2k}} R_k[i, j],$$
$$j = 1, 2, \ldots, H_{2k};$$

(4) calculating the tilt angle:
judging the 17 maximal projection values $m[k]$ and taking the maximum value $$\max_{k=1,2,\ldots,17}(m[k])$$

as the maximum projection value; then, corresponding angular value is $$K = \underset{k=1,2,\ldots,17}{\operatorname{argmax}}(m[k]);$$

if $(K-9)<0$, a ultraviolet check image is tilted clockwise for $|K-9|°$, i.e. the tilt angle is $\beta=|K-9|°$; if $(K-9)=0$, the ultraviolet check image is not tilted and $\beta=0$; and if $(K-9)>0$, the ultraviolet check image is tilted anticlockwise for $|K-9|°$, and the tilt angle is $\beta=-|K-9|°$.

In step 4, the tilt correction position $[i_1, j_1]$ of each pixel $[i, j]$ of the first binary image of the ultraviolet check gray level image is calculated as follows:

$W_3$ represents the width of the tilt corrected ultraviolet check gray level image and the first binary image, and $H_3$ represents the height thereof, and the calculation methods thereof are as follows:

$$W_3=\lfloor W_0 \times \cos|\beta| + H_0 \times \sin|\beta| \rfloor$$

$$H_3=\lfloor W_0 \times \sin|\beta| + H_0 \times \cos|\beta| \rfloor$$

when the tilt angle is $\beta>0$, the ultraviolet check image is corrected anticlockwise for $\beta$:

$$\begin{bmatrix} i_1 \\ j_1 \\ 1 \end{bmatrix} = \begin{bmatrix} \cos\beta & \sin\beta & 0 \\ -\sin\beta & \cos\beta & W_1 \times \sin\beta \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein, $[i_1, j_1]$ is obtained by operating and rounding down to an integer.

when the tilt angle is $\beta<0$, the ultraviolet check image is corrected clockwise for $|\beta|$:

$$\begin{bmatrix} i_1 \\ j_1 \\ 1 \end{bmatrix} = \begin{bmatrix} \cos|\beta| & -\sin|\beta| & H_1 \times \cos|\beta| \\ \sin|\beta| & \cos|\beta| & 0 \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein, $[i_1, j_1]$ is obtained by operating and rounding down to an integer.

when the tilt angle is $\beta=0$, the ultraviolet check image and the first binary image are not corrected.

In step 5, the steps of positioning the top left corner of the first binary image rectangle are as follows:

(1) Determining the search range at the top left corner of the first binary image rectangle:

when L>2.5, the search range at the top left corner $[x_0, y_0]$ of the first binary image rectangle is $[x_0-a, y_0-b]$ for the top left corner, $[x_0+a, y_0-b]$ for the top right corner, $[x_0-a, y_0+b]$ for the bottom left corner and $[x_0+a, y_0+b]$ for the bottom right corner, a is a horizontal offset, and b is a vertical offset, of which both are constants.

when L≤2.5, the search range at the top left corner $[x_0-c, y_0]$ of the first binary image rectangle is $[x_0-a-c, y_0-b]$ for the top left corner, $[x_0+a-c, y_0-b]$ for the top right corner, $[x_0-a-c, y_0+b]$ for the bottom left corner and $[x_0+a-c, y_0+b]$ for the bottom right corner, a is a horizontal offset, b is a vertical offset, and c is the width of the stub.

(2) Calculating convolution values of each pixel and positioning template in the search range of the first binary image:

Performing convolution operation on the positioning template and the first binary image covered by the positioning template, and the positioning template is as follows:

$$T[m, n] = \begin{cases} 1, (m = 26, \ldots, 51 \ \&\& \ n = 26) || (n = 27, \ldots, 51 \ \&\& \ m = 26) \\ -1, (m = 1, \ldots, 25 \ \&\& \ n = 26 || (n = 1, \ldots, 25 \ \&\& \ m = 26) \\ 0, \text{others} \end{cases}$$

m represents a column value of the positioning template, and n represents a row value of the positioning template m=1, 2, . . . , 51, n=1, 2, . . . , 51.

When L>2.5, the calculation method for the convolution value t[i, j] of each pixel and positioning template in the search range of the first binary image is as follows:

$$t[i, j] = \sum_{n=1}^{51} T[26, n] \cdot D_1[i, n+j-26] +$$

$$\sum_{m=1}^{51} T[m, 26] \cdot D_1[m+i-26, j] - D_1[i, j]$$

wherein, $i=x_0-a, x_0-a+1, \ldots, x_0+a, j=y_0-b, y_0-b+1, \ldots, y_0+b$;

when L≤2.5, the calculation method for the convolution value t[i, j] of each pixel and positioning template in the search range of the first binary image is as follows:

$$t[i, j] = \sum_{n=1}^{51} T[26, n] \cdot D_1[i, n+j-26] +$$

$$\sum_{m=1}^{51} T[m, 26] \cdot D_1[m+i-26, j] - D_1[i, j]$$

wherein, $i=x_0-a-c, x_0-a-c+1, \ldots, x_0+a-c, j=y_0-b, y_0-b+1, \ldots, y_0+b$;

in the convolution value t[i, j] of each pixel in the search range of the first binary image, the position corresponding to the maximum value is that at the top left corner of the first binary image rectangle.

In step 6, the extraction process of the second binary image is as follows:

The calculation formula for the value $D_2[i, j]$ of each pixel in the second binary image is as follows:

$$D_2[i, j] = \begin{cases} 255, I[i, j] > th_2 \\ 0, I[i, j] \leq th_2 \end{cases}$$

wherein, $th_2$ is a segmentation threshold, and $th_2$ is selected such that ultraviolet information in the check is highlight, $i=1, 2, \ldots, W_3, j=1, 2, \ldots, H_3$.

completing the information extraction of the ultraviolet gray level images of the check and the check to be verified in step 1 to 6, wherein $W_{30}$ represents the width of the second binary image of the tilt corrected ultraviolet gray level image of the check to be verified, $H_{30}$ represents the width of the second binary image of the tilt corrected ultraviolet gray level image of the check to be verified, $W_{31}$ represents the width of the second binary image of the tilt corrected ultraviolet gray level image of the real check, and $H_{31}$ represents the height of the second binary image of the tilt corrected ultraviolet gray level image of the real check.

After completing information extraction of the ultraviolet gray level images of the check and the check to be verified, the position correction steps of the second binary image of the ultraviolet gray level image of the check to be verified are as follows:

Comparing the position $[x_0, y_0]$ at the top left corner of the first binary image rectangle of the ultraviolet gray level image of the real check and the position $[x_1, y_1]$ at the top left corner of the first binary image rectangle of the ultraviolet gray level image of the check to be verified, and calculating a horizontal position deviation $\Delta x$ and a vertical position deviation $\Delta y$:

$$\Delta x = x0 - x1$$

$$\Delta y = y0 - y1$$

$W_4$ represents the width of the second binary image of the position corrected ultraviolet image of the check to be verified, and $H_4$ represents the height of the second binary image of the position corrected ultraviolet image of the check to be verified:

$$W_4 = W_{30} + \Delta x$$

$$H_4 = H_{30} + \Delta y$$

when $\Delta x >= 0, \Delta y >= 0$, shifting the second binary image of the ultraviolet gray level image of the check to be verified right for $|\Delta x|$ and down for $|\Delta y|$; when $\Delta x >= 0, \Delta y < 0$, shifting the second binary image of the ultraviolet gray level image of the check to be verified right for $|\Delta x|$ and up for $|\Delta y|$; when $\Delta x < 0, \Delta y >= 0$, shifting the second binary image of the ultraviolet gray level image of the check to be verified left for $|\Delta x|$ and down for $|\Delta y|$; when $\Delta x < 0, \Delta y < 0$, shifting the second binary image of the ultraviolet gray level image of the check to be verified left for $|\Delta x|$ and up for $|\Delta y|$.

The authenticity verification steps of the position corrected ultraviolet gray level image of the check to be verified are as follows:

comparing the second binary images of the ultraviolet gray level image of the check to be verified and the real check, and calculating the matching degree M:

$$M = \frac{1}{A} \sum_{j=1}^{H_5} \sum_{i=1}^{W_5} \frac{D_{20}[i, j] * D_{21}[i, j]}{255 * 255}$$

wherein, $D_{20}[i, j]$ represents a binarization value of the horizontal $i^{th}$ pixel perpendicular to $j^{th}$ pixel in the second binary image of the position corrected ultraviolet image of the check to be verified, and $D_{21}[i, j]$ represents the binarization value of the horizontal $i^{th}$ pixel perpendicular to $j^{th}$ pixel in the second binary image of the ultraviolet image of the real check, $A=W_5 \cdot H_5$, $W_5=\min(W_4, W_{31})$, $H_5=\min(H_4, H_{31})$;

when $M>th_3$, the check to be verified is a real one; when $M \leq th_3$, the check to be verified has low matching degree and may be a counterfeit one and requires artificial cognition; and $th_3$ is a matching degree threshold which is a decimal from 0 to 1, and is selected such that any counterfeit check is not misreported.

The method of the present invention can realize authenticity identification of the ultraviolet check image quickly without the network, verify new checks, and achieve automatic check authenticity verification with high verification accuracy.

DESCRIPTION OF THE PREFERRED EMBODIMENT

All checks mentioned in the method provided by this invention refer to new checks, and are hereinafter referred to as checks.

Figure 1:
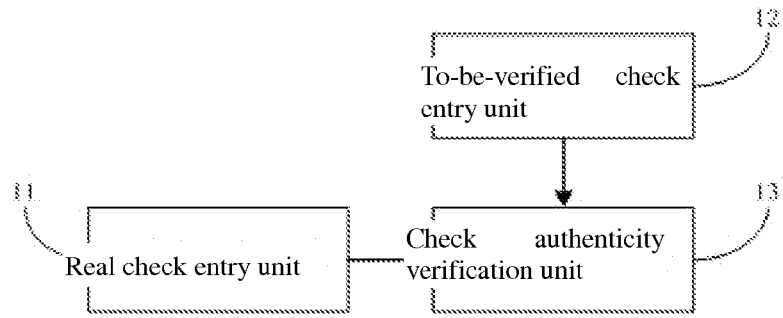
FIG. 1 is a block diagram of a verification system of the invention.

This invention provides an ultraviolet anti-counterfeiting check verification method. The system for the method is shown in FIG. 1, and comprises a real check entry unit, a to-be-verified check entry unit and a check authenticity verification unit.

The real check entry unit 11 is used for scanning the real checks from the banks in advance with a universal ultraviolet scanner, and then storing the obtained ultraviolet images of the real checks, with stored image hereinafter referred to as ultraviolet images of real checks.

The to-be-verified check entry unit 12 is used for scanning a check to be verified with the universal ultraviolet scanner to obtain an ultraviolet image of the check to be verified.

The check authenticity verification unit 13 is used for verifying the check to be verified for authenticity by comparing the ultraviolet image of the check to be verified and a check template from the bank to which the check to be verified belongs, and feeding a verification result back to the bank staff.

The real check entry unit 11 and the to-be-verified check entry unit 12 can share the same ultraviolet scanner.

Figure 2:
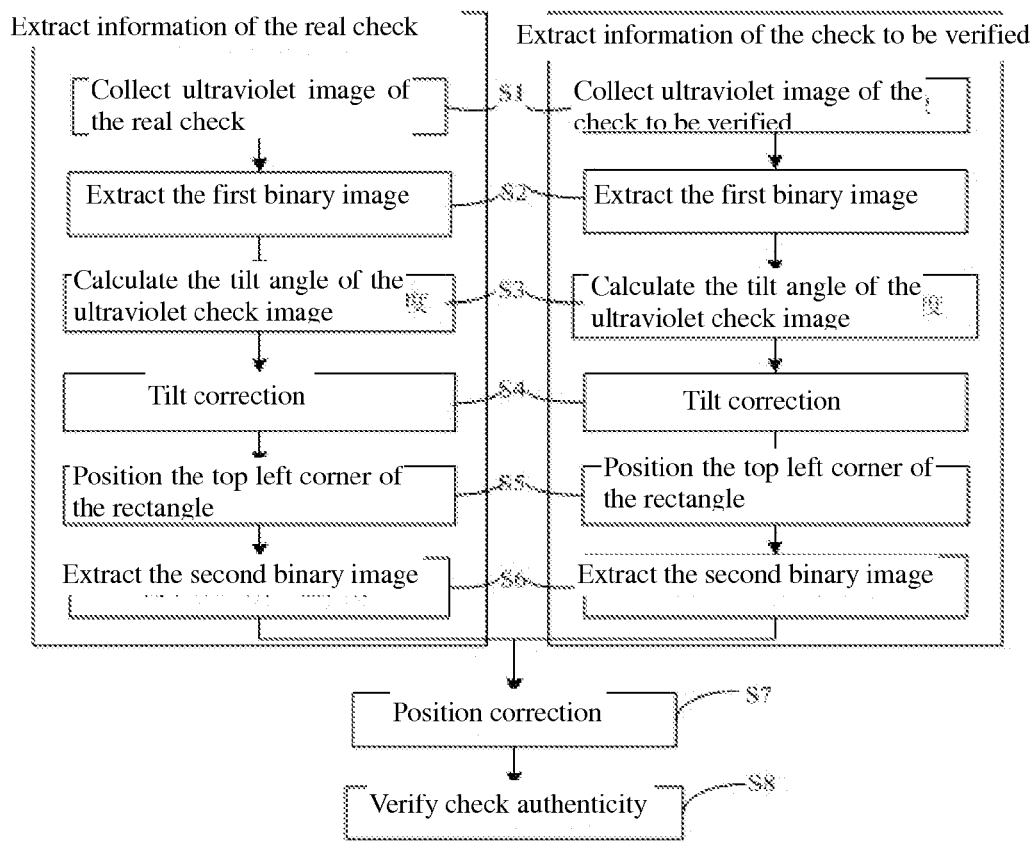
FIG. 2 is an overall flow chart of check authenticity verification of the invention.

The process of the ultraviolet anti-counterfeiting check verification method provided by the invention is shown in FIG. 2, and comprises check information extraction, check position correction and check authenticity judgment. The specific steps are as follows: S1: collecting an ultraviolet image of a check; S2: extracting a first binary image; S3: calculating a tilt angle of the check image on the first binary image; S4: correcting tilt of the first binary image of the ultraviolet check image accordingly; S5: locating a top left corner of a rectangle of the first binary image to solve the matching issue caused by different image sizes; S6: extracting a second binary image from the ultraviolet check image; S7: correcting the position of the second binary image of the check to be verified according to the top left corner position relationship between the first binary image of the check to be verified and the first binary image rectangle of the real check; and S8: calculating matching degree of the check to be verified and the real check to judge authenticity of the check to be verified. The step S1 to step S6 belong to the check information extraction process, and the information extraction process of the real check is identical with that of the check to be verified. With the information extraction process of the real check as an example, the complete check authenticity verification process is described in detail.

I Collection of Ultraviolet Check Image (S1)

As the method mentioned in the invention is performed on gray level images, an ultraviolet image of the real check is read, and then the ultraviolet image is converted into a gray level image. Ultraviolet check image mentioned below refers to the gray level image of the ultraviolet check image.

II Extraction of the First Binary Image (S2)

For the read ultraviolet check gray level image, $I[i, j]$ represents a gray level value of a horizontal $i^{th}$ pixel perpendicular to a $j^{th}$ pixel in the ultraviolet check image, $[i, j]$ traverses all pixels in the ultraviolet gray level image, i is a variable standing for a horizontal position of the pixel in a window image and taken as $i=1, 2, \ldots, W_0$, j is a variable standing for a vertical position of the pixel in a window image and taken as $j=1, 2, \ldots, H_0$, $W_0$ is width of the ultraviolet gray level image, and $H_0$ is height of the ultraviolet gray level image.

For each pixel in the ultraviolet check gray level image, a threshold segmentation method is used to extract black letters and form information in the check to obtain the first binary image of the ultraviolet check gray level image, $D_1[i, j]$ represents a value of the horizontal $i^{th}$ pixel perpendicular to the $j^{th}$ pixel in the first binary image, and the specific calculation methods thereof are as follows:

$$D_1[i, j] = \begin{cases} 255, & I[i, j] < th_1 \\ 0, & I[i, j] \geq th_1 \end{cases} \quad (1)$$

$$i = 1, 2, \ldots, W_0, j = 1, 2, \ldots, H_0$$

Where, $th_1$ is a segmentation threshold, and $th_1$ is selected such that black letters and form information in the check are highlighted, and interference from the ultraviolet image information is removed. In the embodiment of the invention, $th_1=60$.

III Calculation of the Tilt Angle of the Ultraviolet Check Image (S3)

The ultraviolet image scanned by the ultraviolet scanner may tilt due to placement angle, thus affecting a series of subsequent judgments. Therefore, the ultraviolet gray level image is subject to tilt correction prior to other processing on the basis of the calculated tilt angle.

The tilt angle of the ultraviolet gray level image is calculated based on the first binary image obtained in step II; the first binary image is analyzed to determine the appropriate position of the rectangle of filled items in the image; the binary image of the position is extracted as a rectangular binary image; the rectangular binary image is clockwise rotated for −8° to 8° at an interval of 1°; the rectangular binary image rotated is subject to vertical projection for each rotation to calculate the maximal projection value; the maximum value among of the 17 maximal projection values are solved to obtain the rotation angle corresponding to the maximum value, and the angle is the tilt angle of the ultraviolet check gray level image in the counterclockwise direction, The specific steps are as follows:

1. determining the appropriate positions of the item rectangle at left, right, top and bottom in the first binary image according to the length-to-width ratio of the image representing the width-to-height ratio of the first binary image with L, determining whether the stub of the check is torn up according to the width-to-height ratio, and calculating the width-to-height ratio L as follows:

$$L = \frac{W_0}{H_0} \quad (2)$$

As all checks to be detected are new checks, the lengths and widths thereof are fixed in case of no external interference. In the embodiment of the invention, the boundary threshold is taken as 2.5. When $L>2.5$, the check is complete. When $L \leq 2.5$, the stub of the check is torn up.

Assuming that the positions of the rectangles in the first binary image of the complete ultraviolet check gray level image are as follows: top left corner $[x_0, y_0]$, top right corner $[x_1, y_0]$, bottom left corner $[x_0, y_1]$ and bottom right corner $[x_1, y_1]$; certain allowable error is given to the left, right, top and bottom boundaries. Assuming horizontal error is a and vertical error is b; then the appropriate positions of the first binary image rectangle of the complete ultraviolet check gray level image at left, right, top and bottom are as follows: $[x_0-a, y_0-b]$, $[x_1+a, y_0-b]$, $[x_0-a, y_1+b]$ and $[x_1+a, y_1+b]$. Assuming that c is width of the stub torn up, the appropriate positions of the first binary image rectangle of the ultraviolet gray level image of the check with stub torn up are $[x_0-a-c, y_0-b]$ for top left corner, $[x_1+a-c, y_0-b]$ for top right corner, $[x_0-a-c, y_1+b]$ for bottom left corner and $[x_1+a-c, y_1+b]$ for bottom right corner. In the embodiment of the invention, a=20, b=10.

2. extracting the image of the rectangle at the appropriate position in the first binary image as a rectangular binary image, and adjusting the rotation of the rectangular binary image.

R[i, j] represents the value of the $i^{th}$ horizontal pixel perpendicular to the $j^{th}$ pixel in the rectangular binary image, $W_1$ is width of the rectangular binary image, and $H_1$ is height of the rectangular binary image.

When $L>2.5$, the extraction method of the rectangular binary image of the check is as follows:

$$R[i,j]=D_1[x_0-a+i,y_0-b+j], \quad i=1,2,\ldots,W_1, \\ j=1,2,\ldots,H_1 \quad (3\text{-}1)$$

When $L \leq 2.5$, the extraction method of the rectangular binary image of the check is as follows:

$$R[i,j]=D_1[x_0-a-c+i,y_0-b+j], \quad i=1,2,\ldots,W_1, \\ j=1,2,\ldots,H_1 \quad (3\text{-}2)$$

Where, $W_1=x_1-x_0+2\times a+1$, $H_1=y_1-y_0+2\times b+1$.

The rectangular binary image R[i, j] is rotated clockwise for −8° to 8° at an interval of 1°, $W_{2k}$ represents the width of the rectangular binary image area after the $k^{th}$ rotation, and $H_{2k}$ represents the height of the rectangular binary image area after the $k^{th}$ rotation, and the calculation methods thereof are as follows:

$$W_{2k}=\lfloor W_1 \times \cos \alpha + H_1 \times \sin \alpha \rfloor \quad (4\text{-}1)$$

$$H_{2k}=\lfloor W_1 \times \sin \alpha + H_1 \times \cos \alpha \rfloor \quad (4\text{-}2)$$

Where, $\alpha=|k-9|°$ represents rotation angle, $\lfloor \bullet \rfloor$ means the operational symbol rounded down, and $\lfloor W_1 \times \cos \alpha + H_1 \times \sin \alpha \rfloor$ represents a greatest integer not more than $W_1 \times \cos \alpha + H_1 \times \sin \alpha$.

$R_k[i, j]$ represents a value of the horizontal $i^{th}$ pixel perpendicular to the $j^{th}$ pixel in the rectangular binary image after the $k^{th}$ rotation, the value is initialized, and the rectangular binary image i=1, 2, ..., $W_{2k}$ is rotated clockwise for j=1, 2, ..., $H_{2k}$ and anticlockwise for k=1 when R[i, j], −8°, 8° and $\alpha=8°$, then the rectangular binary image $R_1[i, j]$ is obtained, and the calculation formula of the position $[i_1, j_1]$ of the pixel value, corresponding to the position [i, j] of each pixel in the original rectangular binary image R[i, j], in the rectangular binary image $R_1[i, j]$ after anticlockwise rotation for $\alpha$ is as follows:

$$\begin{bmatrix} i_1 \\ j_1 \\ 1 \end{bmatrix} = \begin{bmatrix} \cos\alpha & \sin\alpha & 0 \\ -\sin\alpha & \cos\alpha & W_1 \times \sin\alpha \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix} \quad (5\text{-}1)$$

Where, $[i_1, j_1]$ is obtained by operating and rounding down to an integer.

k is added by 1 in turn; when k=2, 3, ..., 8, the rectangular binary image R[i, j] is rotated anticlockwise for −7° to −1°, then $R_2[i, j], R_3[i, j], \ldots, R_8[i, j]$ at $\alpha=|k-9|°$; when k=9 and the rotation angle is zero, $R_9[i, j]=R[i, j]$; when k=10, 11, ..., 17, the rectangular binary image R[i, j] is rotated clockwise for 1° to 7°, then $\alpha=|k-9|°$; and the calculation formula of the position $[i_1, j_1]$ of the pixel value, corresponding to the position [i, j] of each pixel in the original rectangular binary image R[i, j], in the rectangular binary image $R_1[i, j]$ after clockwise rotation for $\alpha$ is as follows:

$$\begin{bmatrix} i_1 \\ j_1 \\ 1 \end{bmatrix} = \begin{bmatrix} \cos\alpha & -\sin\alpha & H_1 \times \cos\alpha \\ \sin\alpha & \cos\alpha & 0 \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix} \quad (5\text{-}2)$$

Where, $[i_1, j_1]$ is obtained by operating and rounding down to an integer.

$R_{10}[i, j], R_{11}[i, j], \ldots, R_{17}[i, j]$ are obtained respectively, and 17 rectangular binary images $R_k[i, j]$ are obtained in total.

3. Performing vertical projection on each rotated rectangular binary image, and calculating a maximal projection value thereof.

$h_k[j]$ represents the projection value of the $j^{th}$ row of the image after the $k^{th}$ rotation, with calculation formula as follows:

$$h_k[j] = \sum_{i=1}^{W_{2k}} R_k[i, j], \quad (6)$$

$$k = 1, 2, \ldots, 17 \quad j = 1, 2, \ldots, H_{2k}$$

m[k] represents a maximal projection value of the rotation image, and 17 maximal projection values that are m[1], m[2], ..., m[17] respectively are obtained, with calculation formula as follows:

$$m[k] = \max_{j=1,2,\ldots,H_{2k}}(h_k[j]),\qquad(7)$$

$$k = 1, \ldots, 17$$

4. Judging the 17 maximal projection values obtained in the last step, calculating the angle value corresponding to the maximum projection value, and then calculating the tilt angle The 17 maximal projection values m[k] are judged and the maximum value $$\max_{k=1,2,\ldots,17}(m[k]),$$

is taken as the maximum projection value; then corresponding rotation angle value is $$K = \underset{k=1,2,\ldots,17}{\mathrm{argmax}}(m[k]);$$

if $(K-9)<0$, the ultraviolet check image is not tilted and $|K-9|°$; and if $\beta=|K-9|°$, the ultraviolet check image is tilted anticlockwise for $(K-9)=0$, and the tilt angle is $\beta=0$.

It is important to note that the calculated tilt angle in the invention is only for small tilt angle; large tilt angle is visually judged; and if the tilt angle is too large, the check information is entered again.

IV Tilt Correction (S4)

The ultraviolet check gray level image and the first binary image are subject to tilt compensation according to the tilt angle obtained in step 3 to finish tilt correction, $W_3$ stands for width of the tilt corrected ultraviolet check gray level image and the first binary image, $H_3$ stands for height of the tilt corrected ultraviolet check gray level image and the first binary image, and the calculation methods thereof are as follows:

$$W_3 = \lfloor W_0 \times \cos|\beta| + H_0 \times \sin|\beta| \rfloor \qquad (8\text{-}1)$$

$$H_3 = \lfloor W_0 \times \sin|\beta| + H_0 \times \cos|\beta| \rfloor \qquad (8\text{-}2)$$

When the tilt angle $\beta>0$, the ultraviolet check image and the first binary image are corrected clockwise as per formula (5-1), where $\alpha=\beta$; when the tilt angle $\beta<0$, the ultraviolet check image and the first binary image are corrected clockwise as per formula (5-2), where $\alpha=|\beta|$; and when $\beta=0$, the ultraviolet check image and the first binary image are not corrected.

V Top Left Corner Positioning of Rectangle (S5)

Different images scanned by the ultraviolet scanner have more or less interference, and the check information at the same positions of different checks is not corresponding. As a result, the check position shall be corrected, and the top left corner of the rectangle in the image can be used as the reference of correction due to obvious position thereof. Therefore, the rectangle shall be subject to positioning firstly.

In the tilt corrected first binary image, the search range at the top left corner of the rectangle is determined, and then weighted calculation is done together with the positioning template to finish accurate positioning of the top left corner of the rectangle.

1. Determining the Search Range at the Top Left Corner of the Rectangle

After step 3, it is possible to determine whether the stub of the check has been torn up. Assuming that the position at the top left corner of the rectangle in the complete ultraviolet check gray level image is $[x_0, y_0]$, and certain width margin is given to the top left corner; and assuming that the horizontal offset is a and the vertical offset is b, then the search range at the top left corner of the first binary image rectangle is $[x_0-a, y_0-b]$ for the top left corner, $[x_0+a, y_0-b]$ for the top right corner, $[x_0-a, y_0+b]$ for the bottom left corner $[x_0-a, y_0+b]$ and $[x_0+a, y_0+b]$ for the bottom right corner. The search range at the top left corner of the first binary image rectangle is shown as the dash area in FIG. 3. In the embodiment of the invention, a=20, b=10.

Assuming that c is the width of the stub torn up, the position thereof at the top left corner in the ultraviolet gray level image rectangle of the check with stub torn up is $[x_0-c, y_0]$, and certain width margin is given to the top left corner; and assuming that the horizontal offset is a and the vertical offset is b, then the search range at the top left corner of the first binary image rectangle is $[x_0-a-c, y_0-b]$ for the top left corner $[x_0-a-c, y_0-b]$, $[x_0+a-c, y_0-b]$ for the top right corner, $[x_0-a-c, y_0-b]$ for the bottom left corner $[x_0-a-c, y_0-b]$ and $[x_0+a-c, y_0-b]$ for the bottom right corner. The search range at the top left corner of the first binary image rectangle is shown as the dash area in FIG. 4. In the embodiment of the invention, $[x_0-a-c, y_0+b]$.

2. Calculating Convolution Value of Each Pixel and Positioning Template in the Search Range of the First Binary Image From the top left corner, the positioning template is moved from left to right and from top to bottom within the search range in order; each time when the window of the positioning template is moved, the center of the positioning template is allowed to coincide with the corresponding point within the search range; the convolution value of the positioning template and the image covered by the positioning template is calculated; m represents a column value of the positioning template and n represents a row value of the positioning template, with m=1, 2, . . . , 51 and n=1, 2, . . . , 51; and T[m, n] represents a value of the positioning template in the $n^{th}$ column and $m^{th}$ row, and is calculated as follows:

$$T[m, n] = \begin{cases} 1, & (m = 26, \ldots, 51 \text{ \&\& } n = 26) \| (n = 27, \ldots, 51 \text{ \&\& } m = 26) \\ -1, & (m = 1, \ldots, 25 \text{ \&\& } n = 26) \| (n = 1, \ldots, 25 \text{ \&\& } m = 26) \\ 0, & \text{others} \end{cases} \qquad (9)$$

When L>2.5, the calculation method for the convolution value t[i, j] of each pixel and positioning template in the search range of the first binary image is as follows:

$$t[i, j] = \sum_{n=1}^{51} T[26, n] \cdot D_1[i, n+j-26] + \qquad (10\text{-}1)$$

$$\sum_{m=1}^{51} T[m, 26] \cdot D_1[m+i-26, j] - D_1[i, j]$$

Figure 3:
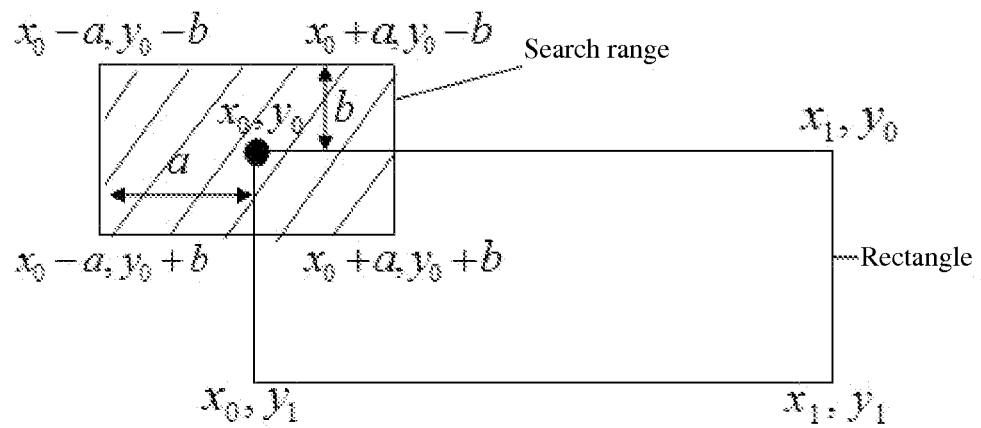
FIG. 3 is a schematic diagram of the search range at the top left corner of the rectangle of a complete check.

Where, $i=x_0-a, x_0-a+1, \ldots, x_0+a, j=y_0-b, y_0-b+1, \ldots, y_0+b$, and $[i, j]$ traverses all pixels in the dash area in FIG. 3.

When $L \leq 2.5$, the calculation method for the convolution value $t[i, j]$ of each pixel and positioning template in the search range of the first binary image is as follows:

$$t[i, j] = \sum_{n=1}^{51} T[26, n] \cdot D_1[i, n+j-26] + \sum_{m=1}^{51} T[m, 26] \cdot D_1[m+i-26, j] - D_1[i, j] \quad (10\text{-}2)$$

Figure 4:
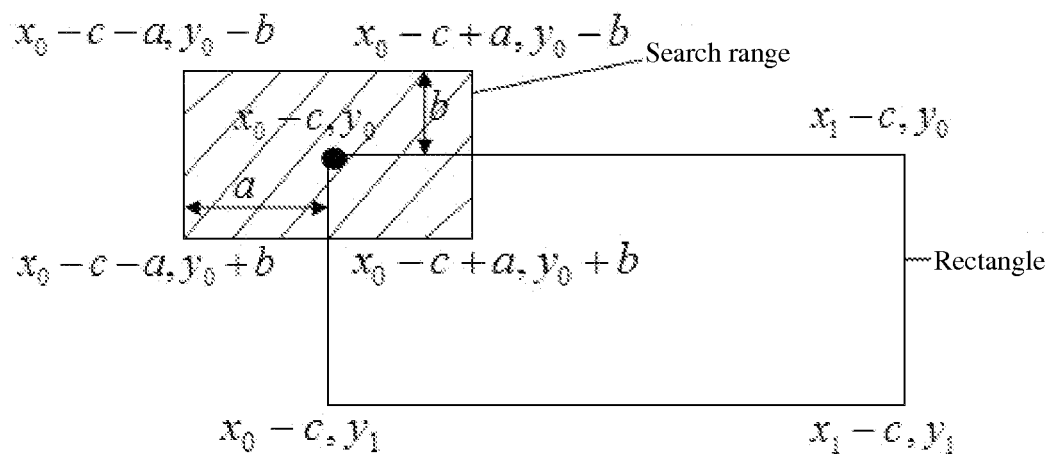
FIG. 4 is a schematic diagram of the search range at top left corner of the rectangle of a check with stub torn up.

Where, $i=x_0-a-c, x_0-a-c+1, \ldots, x_0+a-c, j=y_0-b, y_0-b+1, \ldots, y_0+b$, and $[i, j]$ traverses all pixels in the dash area in FIG. 4.

3. Accurate Positioning

In the convolution value $t[i, j]$ of each pixel in the search range of the first binary image, the position corresponding to the maximum value is that at the top left corner of the first binary image rectangle.

VI Extraction of the Second Binary Image (S6)

For each pixel in the tilt corrected ultraviolet check image, the ultraviolet information in the check is extracted with the threshold segmentation method, and other information is removed to obtain the second binary image of the ultraviolet check image. $D_2[i, j]$ represents a value of the horizontal $i^{th}$ pixel perpendicular to the $j^{th}$ pixel in the second binary image, and the specific calculation method thereof is as follows:

$$D_2[i, j] = \begin{cases} 255, & I[i, j] > th_2 \\ 0, & I[i, j] \leq th_2 \end{cases}, \quad (11)$$
$$i = 1, 2, \ldots, W_3, j = 1, 2, \ldots, H_3$$

Where, $th_2$ is a segmentation threshold, and $th_2$ is selected such that ultraviolet information in the check is highlighted. In the embodiment of the invention, $th_2=170$.

The information extraction of the ultraviolet gray level images of the check and the check to be verified is completed according to the process, $W_{30}$ represents the width of the second binary image of the tilt corrected ultraviolet gray level image of the check to be verified, $H_{30}$ represents the width of the second binary image of the tilt corrected ultraviolet gray level image of the check to be verified, $W_{31}$ represents the width of the second binary image of the tilt corrected ultraviolet gray level image of the real check, and $H_{31}$ represents the height of the second binary image of the tilt corrected ultraviolet gray level image of the real check.

VII Position Correction (S7)

The six steps result in determination of the positions at the top left corners of the ultraviolet gray level image rectangles of the real check and the check to be verified as well as the second binary images thereof. Firstly, the positions at the top left corners of the ultraviolet gray level image rectangles of the real check and the check to be verified are compared to calculate the position deviation and correct the positions. The position $[x_0, y_0]$ at the top left corner of the first binary image rectangle of the ultraviolet gray level image of the real check is compared with the position $\Delta y$ at the top left corner of the first binary image rectangle of the ultraviolet gray level image of the check to be verified to calculate a horizontal position deviation $[x_0, y_0]$ and a vertical position deviation $[x_1, y_1]$, and the calculation method thereof is as follows:

$$\begin{cases} \Delta x = x0 - x1 \\ \Delta y = y0 - y1 \end{cases} \quad (12)$$

$W_4$ represents the width of the second binary image of the position corrected ultraviolet image of the check to be verified, and $H_4$ represents the height of the second binary image of the position corrected ultraviolet image of the check to be verified:

$$W_4 = W_{30} + \Delta x \quad (13\text{-}1)$$

$$H_4 = H_{30} + \Delta y \quad (13\text{-}2)$$

For position deviation, the position of the second binary image of the ultraviolet gray level image of the check to be verified is corrected as follows: when $\Delta x \geq 0$, $\Delta y \geq 0$, the second binary image of the ultraviolet gray level image of the check to be verified is shifted right for $|\Delta x|$ and down for $|\Delta y|$; when $\Delta x \geq 0$, $\Delta y < 0$, the second binary image of the ultraviolet gray level image of the check to be verified is shifted right for $|\Delta x|$ and up for $|\Delta y|$; when $\Delta x < 0$, $\Delta y \geq 0$, the second binary image of the ultraviolet gray level image of the check to be verified is shifted left for $|\Delta x|$ and down for $|\Delta y|$; and when $\Delta x < 0$, $\Delta y < 0$, the second binary image of the ultraviolet gray level image of the check to be verified is shifted left for $|\Delta x|$ and up for $|\Delta y|$.

VIII Check Authenticity Verification (S8)

The second binary image of the position corrected ultraviolet gray level image of the check to be verified is compared with that of the real check to calculate the matching degree M. $D_{20}[i, j]$ represents a binarization value of the horizontal $i^{th}$ pixel perpendicular to $j^{th}$ pixel in the second binary image of the position corrected ultraviolet image of the check to be verified, and $D_{21}[i, j]$ represents the binarization value of the horizontal $i^{th}$ pixel perpendicular to $j^{th}$ pixel in the second binary image of the ultraviolet image of the real check.

The calculation method of the matching degree M is as follows:

$$M = \frac{1}{A} \sum_{j=1}^{H_5} \sum_{i=1}^{W_5} \frac{D_{20}[i, j] * D_{21}[i, j]}{255 * 255} \quad (14)$$

Where, $A = W_5 \cdot H_5$, $W_5 = \min(W_4, W_{31})$ and $H_5 = \min(H_4, H_{31})$, When $M > th_3$, the check to be verified is a real one; when $M \leq th_3$, the check to be verified has low matching degree and is subject to artificial cognition; and $th_3$ is a matching degree threshold which is a decimal from 0 to 1, and is selected such that any counterfeit check is not misreported. In the embodiment of the invention, $th_3=0.8$.

The method provided in the embodiment of the invention is to identify the check for authenticity with the image processing method, and the method is quick, easy-to-understand and obvious in effect, and plays an important role in achieving automatic check authenticity verification.

In conclusion, the technical solution provided by the invention can realize authenticity identification of ultraviolet check image quickly, thus overcoming the subjectivity defect and time-consuming and energy-consuming issues of artificial detection.

What is described above is only an example of the invention and not construed as any limitation thereto. Any modification, equivalent replacement and improvement made within the spirit and principle of the invention can fall into the protection scope of the invention.

The invention claimed is:

1. A ultraviolet anti-counterfeiting check verification method, comprising:

scanning a real check issued by a bank to obtain a first ultraviolet gray level image;

scanning a check to be verified to obtain a second ultraviolet gray level image; and verifying the authenticity of the second ultraviolet gray level image, wherein the verification step further comprises, performing for each of the first ultraviolet gray level image and the second ultraviolet gray level image, both referred to as the ultraviolet gray level image, the following steps:

(2) extracting a first binary image from the ultraviolet gray level image;

(3) calculating a tilt angle of the first binary image;

(4) calculating a tilt correction position of each pixel of the ultraviolet gray level image and the first binary image to obtain a tilt-corrected ultraviolet gray level image and a tilt-corrected first binary image;

(5) determining a top left corner locating position of a first binary image rectangle; and (6) extracting a second binary image from the tilt corrected ultraviolet gray level image, wherein Step (2) satisfies $$D_1[i, j] = \begin{cases} 255, & I[i, j] < th_1 \\ 0, & I[i, j] \geq th_1 \end{cases}$$

wherein $D_1[i, j]$ represents a value of a horizontal $i^{th}$ pixel perpendicular to a $j^{th}$ pixel in the first binary image, i is a variable prepresenting a horizontal position of a pixel in a window image and taken as i=1, 2, ... $W_0$, j is a variable representing a vertical position of the pixel in a window image and taken as j=1, 2, ... $H_0$, $W_0$ represents a width of the ultraviolet gray level image, $H_0$ represents a height of the ultraviolet gray level image, $I[i, j]$ represents a gray value of the horizontal $i^{th}$ pixel perpendicular to the $j^{th}$ pixel in the ultraviolet gray level image, $th_1$ is a segmentation threshold, and $th_1$ is selected to highlight black letters and form information in the check to reduce interferences from ultraviolet information in the ultraviolet gray level image, wherein Step (3) further comprises:

(a) calculating a width-to-height ratio L of the first binary image:

$$L = \frac{W_0}{H_0}$$

wherein when L>2.5, $[x_0-a, y_0-b]$, $[x_1+a, y_0-b]$, $[x_0-a, y_1+b]$ and $[x_1+a, y_1+b]$ are positions of a top left corner, a top right corner, a bottom left corner and a bottom right corner of a first binary image rectangle respectively, when L≤2.5, a stub with a width of c is torn up, and $[x_0-a-c, y_0-b]$, $[x_1+a-c, y_0-b]$, $[x_0-a-c, y_1+b]$ and $[x_1+a-c, y_1+b]$ are positions of the top left corner, the top right corner, the bottom left corner and the bottom right corner of the first binary image rectangle respectively, a is a horizontal error value, b is a vertical error value, $x_0$, $x_1$ each represents a horizontal coordinate of the pixel, and $y_0$, $y_1$ each represents a vertical coordinate of the pixel;

(b) extracting a rectangular binary image R[i, j]:

$$R[i, j] = \begin{cases} D_1[x_0-a+i, y_0-b+j], & L > 2.5 \\ D_1[x_0-a-c+i, y_0-b+j], & L \leq 2.5 \end{cases}$$

wherein, i=1, 2, $W_1$, j=1, 2, ... $H_1$, $W_1=x_1-x_0+2\times a+1$, $H_1=y_1-y_0+2\times b+1$, $W_1$ is width of the rectangular binary image, $H_1$ is height of the rectangular binary image, and R[i, j] represents the value of the horizontal $i^{th}$ pixel perpendicular to the $j^{th}$ pixel in the rectangular binary image;

the rectangular binary image R[i, j] is rotated clockwise for −8° to 8° at an interval of 1°, $W_{2k}$ represents the width of the rectangular binary image area after the $k^{th}$ rotation, and $H_{2k}$ represents the height of the rectangular binary image area after the $k^{th}$ rotation, wherein $$W_{2k} = \lfloor W_1 \times \cos \alpha + H_1 \times \sin \alpha \rfloor$$

$$H_{2k} = \lfloor W_1 \times \sin \alpha + H_1 \times \cos \alpha \rfloor$$

wherein $\alpha = |k-9|°$ represents a rotation angle, wherein $\lfloor \bullet \rfloor$ is a symbol representing rounded down operation so that $\lfloor W_1 \times \cos \alpha + H_1 \times \sin \alpha \rfloor$ represents a greatest integer not more than a value $W_1 \times \cos \alpha + H_1 \times \sin \alpha$;

$R_k[i, j]$ represents a value of the horizontal $i^{th}$ pixel perpendicular to the $j^{th}$ pixel in the rectangular binary image after the $k^{th}$ rotation, the value is initialized, and the rectangular binary image R[i, j] is rotated clockwise for −8° and anticlockwise for 8° when k=1, $R_k[i, j]$=0, i=1, 2, ..., $W_{2k}$ and j=1, 2, ..., $H_{2k}$, $\alpha$=8° at that time, then the rotated rectangular binary image $R_1[i, j]$ is obtained, and the calculation formula of the position $[i_1, j_1]$ of the pixel value, corresponding to the position [i, j] of each pixel in the original rectangular binary image R[i, j], in the rectangular binary image $R_1[i, j]$ after anticlockwise rotation for $\alpha$ is as follows:

$$\begin{bmatrix} i_1 \\ j_1 \\ 1 \end{bmatrix} = \begin{bmatrix} \cos\alpha & \sin\alpha & 0 \\ -\sin\alpha & \cos\alpha & W_1 \times \sin\alpha \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein $[i_1, j_1]$ is obtained by operating and rounding down to an integer;

k is added by 1 in turn; when k=2, 3, ..., 8, the rectangular binary image R[i, j] is rotated anticlockwise for −7° to −1°, then $R_2[i, j]$, $R_3[i, j]$, ... $R_8[i, j]$ at $\alpha=|k-9|°$; when k=9 and the rotation angle is zero, $R_9[i, j]$=R[i, j]; when k=10, 11, ..., 17, the rectangular binary image R[i, j] is rotated clockwise for 1° to 7°, then $\alpha=|k-9|°$; and calculation formula of the position $[i_1, j_1]$ of the pixel value, corresponding to the position [i, j] of each pixel in the original rectangular binary image R[i, j], in the rectangular binary image $R_k[i, j]$ after anticlockwise rotation for $\alpha$ is as follows:

$$\begin{bmatrix} i_1 \\ j_1 \\ 1 \end{bmatrix} = \begin{bmatrix} \cos\alpha & -\sin\alpha & H_1 \times \cos\alpha \\ \sin\alpha & \cos\alpha & 0 \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein $[i_1, j_1]$ is obtained by operating and rounding down to an integer:

obtaining $R_{10}[i, j], R_{11}[i, j], \ldots, R_{17}[i, j]$ respectively, 17 rectangular binary images $R_k[i, j]$ in total;

(c) performing vertical projection on each rotated rectangular binary image, and calculating a maximal projection value m[k] thereof:

$$m[k] = \max_{j=1,2,\ldots,H_{2k}}(h_k[j]), k = 1, \ldots, 17,$$

wherein, $h_k[j]$ represents a vertical projection value of the rotated rectangular binary image, $$h_k[j] = \sum_{i=1}^{W_{2k}} R_k[i, j], j = 1, 2, \ldots, H_{2k};$$

(d) calculating the tilt angle by
judging the 17 maximal projection values m[k] and taking the maximum value $$\max_{k=1,2,\ldots,17}(m[k])$$

as the maximum projection value, then corresponding angular value is $$K = \underset{k=1,2,\ldots,17}{\operatorname{argmax}}(m[k]);$$

when (K−9)<0, tilting the ultraviolet check image clockwise for the tilt angle of β=|K−9|°; when (K−9)=0, the ultraviolet check image is not tilted and β=0; and when (K−9)>0, tilting the ultraviolet check image anticlockwise for the tilt angle of β=−|K−0|°.

2. The ultraviolet anti-counterfeiting check verification method according to claim 1, wherein Step (5) further comprises:
determining a search range at the top left corner of the first binary image rectangle:
when L>2.5, the search range at the top left corner $[x_0, y_0]$ of the first binary image image rectangle is $[x_0-a, y_0-b]$ for the top left corner, $[x_0+a, y_0-b]$ for the top right corner, $[x_0-a, y_0+b]$ for the bottom left corner and $[x_0+a, y_0+b]$ for the bottom right corner, a is a horizontal offset, and b is a vertical offset, of which both are constants;
when L≤2.5, the search range at the top left corner $[x_0-c, y_0]$ of the first binary image rectangle is $[x_0-a-c, y_0-b]$ for the top left corner, $[x_0+a-c, y_0-b]$ for the top right corner, $[x_0-a-c, y_0+b]$ for the bottom left corner and $[x_0+a-c, y_0+b]$ for the bottom right corner, a is a horizontal offset, b is a vertical offset, and c is the width of the stub;

calculating convolution values of each pixel and positioning template in the search range of the first binary image by
performing convolution operation on the positioning template and the first binary image covered by the positioning template, and the positioning template is as follows:

$$T[m, n] = \begin{cases} 1, & (m=26,\ldots,51 \,\&\&\, n=26) \| (n=27,\ldots,51 \,\&\&\, m=26) \\ -1, & (m=1,\ldots,25 \,\&\&\, n=26) \| (n=1,\ldots,25 \,\&\&\, m=26) \\ 0, & \text{others} \end{cases}$$

Wherein m represents a column value of the positioning template, and n represents a row value of the positioning template m=1, 2, ..., 51, n=1, 2, ..., 51;

When L>2.5, the convolution value t[i, j] of each pixel and positioning template in the search range of the first binary image is $$t[i, j] = \sum_{n=1}^{51} T[26, n] \cdot D_1[i, n+j-26] + \sum_{m=1}^{51} T[m, 26] \cdot D_1[m+i-26, j] - D_1[i, j]$$

wherein, $i=x_0-a, x_0-a+1, \ldots, x_0+a, j=y_0-b, y_0-b+1, \ldots, y_0+b$;

when L≤2.5, the convolution value t[i, j] of each pixel and positioning template in the search range of the first binary image is $$t[i, j] = \sum_{n=1}^{51} T[26, n] \cdot D_1[i, n+j-26] + \sum_{m=1}^{51} T[m, 26] \cdot D_1[m+i-26, j] - D_1[i, j]$$

wherein, $i=x_0-a-c, x_0-a-c+1, \ldots, x_0+a-c, j=y_0-b, y_0-b+1, \ldots, y_0+b$; and in the convolution value t[i, j] of each pixel in the search range of the first binary image, the position corresponding to the maximum value is that at the top left corner of the first binary image rectangle.

3. The ultraviolet anti-counterfeiting check verification method according to claim 2, further comprising correcting the second binary image of the ultraviolet gray level image of the check to be verified, which comprises:
comparing the position $[x_0, y_0]$ at the top left corner of the first binary image rectangle of the ultraviolet gray level image of the real check and the position $[x_1, y_1]$ at the top left corner of the first binary image rectangle of the ultraviolet gray level image of the check to be verified, and calculating a horizontal position deviation Δx and a vertical position deviation Δy:

Δx=x0−x1

Δy=y0−y1

$W_4$ represents the width of the second binary image of the position corrected ultraviolet image of the check to be verified, and $H_4$ represents the height of the second binary image of the position corrected ultraviolet image of the check to be verified:

$W_4 = W_{30} + \Delta x$ $H_4 = H_{30} + \Delta y$ when $\Delta x \geq 0$, $\Delta y \geq 0$, shifting the second binary image of the ultraviolet gray level image of the check to be verified right for $|\Delta x|$ and down for $|\Delta y|$; when $\Delta x \geq 0$, $\Delta y < 0$, shifting the second binary image of the ultraviolet gray level image of the check to be verified right for $|\Delta x|$ and up for $|\Delta y|$; when $\Delta x < 0$, $\Delta y \geq 0$, shifting the second binary image of the ultraviolet gray level image of the check to be verified left for $|\Delta x|$ and down for $|xy|$; when $\Delta x < 0$, $\Delta y < 0$, shifting the second binary image of the ultraviolet gray level image of the check to be verified left for $|\Delta x|$ and up for $|\Delta y|$.

4. The ultraviolet anti-counterfeiting check verification method according to claim 3, further comprising:
comparing the second binary images of the position corrected ultraviolet gray level image of the check to be verified and the real check, and calculating the matching degree M, $$M = \frac{1}{A} \sum_{j=1}^{H_5} \sum_{i=1}^{W_5} \frac{D_{20}[i,j] * D_{21}[i,j]}{255 * 255}$$

wherein $D_{20}[i, j]$ represents a binarization value of the horizontal $i^{th}$ pixel perpendicular to $j^{th}$ pixel in the second binary image of the position corrected ultraviolet image of the check to be verified, and $D_{21}[i, j]$ represents the binarization value of the horizontal $i^{th}$ pixel perpendicular to $j^{th}$ pixel in the second binary image of the ultraviolet image of the real check, $A = W_5 \cdot H_5$, $W_5 = \min(W_4, W_{31})_7$ and $H_5 = \min(H_4, H_{31})$, when $M > th_3$, the check to be verified is a real one; when $M \leq th_3$, the check to be verified has low matching degree and may be a counterfeit one and requires artificial cognition; and $th_3$ is a matching degree threshold which is a decimal from 0 to 1, and is selected such that any counterfeit check is not misreported.

5. The ultraviolet anti-counterfeiting check verification method according to claim 1, wherein the tilt correction position $[i_1, j_1]$ of each pixel $[i, j]$ of the first binary image of the ultraviolet check gray level image is $W_3 = \lfloor W_0 \times \cos|\beta| + H_0 \times \sin|\beta| \rfloor$ $H_3 = \lfloor W_0 \times \sin|\beta| + H_0 \times \cos|\beta| \rfloor$ wherein $W_3$ represents the width of the tilt corrected ultraviolet check gray level image and the first binary image, and $H_3$ represents the height thereof, when the tilt angle is $\beta > 0$, the ultraviolet check image is corrected anticlockwise for $\beta$:

$$\begin{bmatrix} i_1 \\ j_1 \\ 1 \end{bmatrix} = \begin{bmatrix} \cos\beta & \sin\beta & 0 \\ -\sin\beta & \cos\beta & W_1 \times \sin\beta \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein, $[i_1, j_1]$ is obtained by operating and rounding down to an integer;
when the tilt angle is $\beta < 0$, the ultraviolet check image is corrected clockwise for $|\beta|$:

$$\begin{bmatrix} i_1 \\ j_1 \\ 1 \end{bmatrix} = \begin{bmatrix} \cos|\beta| & -\sin|\beta| & H_1 \times \cos|\beta| \\ \sin|\beta| & \cos|\beta| & 0 \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein $[i_1, j_1]$ is obtained by operating and rounding down to an integer;
When the tilt angle is $\beta = 0$, the ultraviolet check image and the first binary image are not corrected.

6. A ultraviolet anti-counterfeiting check verification method, comprising:
scanning a real check issued by a bank to obtain a first ultraviolet gray level image;
scanning a check to be verified to obtain a second ultraviolet gray level image;
verifying the authenticity of the second ultraviolet gray level image,
wherein the verification step further comprises, performing for each of the first ultraviolet gray level image and the second ultraviolet gray level image, each referred to as the ultraviolet gray level image, the following steps:
(2) extracting a first binary image from the ultraviolet gray level image;
(3) calculating a tilt angle of the first binary image;
(4) calculating a tilt correction position of each pixel of the ultraviolet gray level image and the first binary image to obtain a tilt-corrected ultraviolet gray level image and a tilt-corrected first binary image;
(5) determining a top left corner locating position of a first binary image rectangle; and
(6) extracting a second binary image from the tilt corrected ultraviolet gray level image,
wherein the tilt correction position $[i_1, j_1]$ of each pixel $[i, j]$ of the first binary image of the ultraviolet check gray level image satisfy:

$W_3 = \lfloor W_0 \times \cos|\beta| + H_0 \times \sin|\beta| \rfloor$ $H_3 = \lfloor W_0 \times \sin|\beta| + H_0 \times \cos|\beta| \rfloor$ $W_3 = \lfloor W_0 \times \cos|\beta| + H_0 \times \sin|\beta| \rfloor$ $H_3 = \lfloor W_0 \times \sin|\beta| + H_0 \times \cos|\beta| \rfloor$ wherein $W_3$ represents the width of the tilt-corrected ultraviolet check gray level image and the first binary image, and $H_3$ represents the height thereof,
when the tilt angle is $\beta > 0$, the ultraviolet check image is corrected anticlockwise for $\beta$:

$$\begin{bmatrix} i_1 \\ j_1 \\ 1 \end{bmatrix} = \begin{bmatrix} \cos\beta & \sin\beta & 0 \\ -\sin\beta & \cos\beta & W_1 \times \sin\beta \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein $[i_1, j_1]$ is obtained by operating and rounding down to an integer;
when the tilt angle is $\beta < 0$, the ultraviolet pray level image is corrected clockwise for $|\beta|$:

$$\begin{bmatrix} i_1 \\ j_1 \\ 1 \end{bmatrix} = \begin{bmatrix} \cos|\beta| & -\sin|\beta| & H_1 \times \cos|\beta| \\ \sin|\beta| & \cos|\beta| & 0 \\ 0 & 0 & 1 \end{bmatrix} \begin{bmatrix} i-1 \\ j-1 \\ 1 \end{bmatrix} + \begin{bmatrix} 1 \\ 1 \\ 0 \end{bmatrix}$$

wherein [i₁, j₁] is obtained by operating and rounding down to an integer;
when the tilt angle is β=0, the ultraviolet gray level image and the first binary image are not corrected.

7. The ultraviolet anti-counterfeiting check verification method according to claim 6, wherein a value $D_2[i, j]$ of each pixel in the second binary image is $$D_2[i, j] = \begin{cases} 255, & I[i, j] > th_2 \\ 0, & I[i, j] \le th_2 \end{cases}$$

wherein $th_2$ is a segmentation threshold, and $th_2$ selected such that ultraviolet information in the check is highlighted, i=1, 2, ..., $W_3$, j=1, 2, ..., $H_3$,
completing the information extraction of the ultraviolet gray level images of the check and the check to be verified according to the process, wherein $W_{30}$ represents the width of the second binary image of the tilt corrected ultraviolet gray level image of the check to be verified, $H_{30}$ represents the width of the second binary image of the tilt corrected ultraviolet gray level image of the check to be verified, $W_{31}$ represents the width of the second binary image of the tilt corrected ultraviolet gray level image of the real check, and $H_{31}$ represents the height of the second binary image of the tilt corrected ultraviolet gray level image of the real check.

8. The ultraviolet anti-counterfeiting check verification method according to claim 7, further comprising:
comparing the second binary images of the position corrected ultraviolet gray level image of the check to be verified and the real check, and calculating the matching degree M, $$M = \frac{1}{A} \sum_{j=1}^{H_5} \sum_{i=1}^{W_5} \frac{D_{20}[i, j] * D_{21}[i, j]}{255 * 255}$$

wherein $D_{20}[i, j]$ represents a binarization value of the horizontal $i^{th}$ pixel perpendicular to $j^{th}$ pixel in the second binary image of the position corrected ultraviolet image of the check to be verified, and $D_{21}[i, j]$ represents the binarization value of the horizontal $i^{th}$ pixel perpendicular to $j^{th}$ pixel in the second binary image of the ultraviolet image of the real check, $A=W_5 \cdot H_5$, $W_5=\min(W_4, W_{31})$, and $H_5=\min(H_4, H_{31})$,
when $M>th_3$, the check to be verified is a real one; when $M \le th_3$, the check to be verified has low matching degree and may be a counterfeit one and requires artificial cognition; and $th_3$ is a matching degree threshold which is a decimal from 0 to 1, and is selected such that any counterfeit check is not misreported.

9. The ultraviolet anti-counterfeiting check verification method according to claim 7, further comprising correcting the second binary image of the ultraviolet gray level image of the check to be verified, which comprises:
comparing the position $[x_0, y_0]$ at the top left corner of the first binary image rectangle of the ultraviolet gray level image of the real check and the position $[x_1, y_1]$ at the top left corner of the first binary image rectangle of the ultraviolet gray level image of the check to be verified, and calculating a horizontal position deviation $\Delta x$ and a vertical position deviation $\Delta y$:

$$\Delta x = x_0 - x_1$$

$$\Delta y = y_0 - y_1$$

$W_4$ represents the width of the second binary image of the position corrected ultraviolet image of the check to be verified, and $H_4$ represents the height of the second binary image of the position corrected ultraviolet image of the check to be verified:

$$W_4 = W_{30} + \Delta x$$

$$H_4 = H_{30} + \Delta y$$

when $\Delta x \ge 0$, $\Delta y \ge 0$, shifting the second binary image of the ultraviolet gray level image of the check to be verified right for $|\Delta x|$ and down for $|\Delta y|$; when $\Delta x \ge 0$, $\Delta y < 0$, shifting the second binary image of the ultraviolet gray level image of the check to be verified right for $|\Delta x|$ and up for $|\Delta y|$; when $\Delta x < 0$, $\Delta y \ge 0$, shifting the second binary image of the ultraviolet gray level image of the check to be verified left for $|\Delta x|$ and down for $|\Delta y|$; when $\Delta x < 0$, $\Delta y < 0$, shifting the second binary image of the ultraviolet gray level image of the check to be verified left for $|\Delta x|$ and up for $|\Delta y|$.

\* \* \* \* \*